(No Model.)

H. B. NICKERSON.
AERIAL BICYCLE.

No. 563,793. Patented July 14, 1896.

Witnesses
Fred A. Mason
C. O. Mason

Inventor
Hiram B. Nickerson
by H. W. Mason
Atty.

THE NORRIS PETERS CO., PHOTO-LITHO., WASHINGTON, D. C.

UNITED STATES PATENT OFFICE.

HIRAM B. NICKERSON, OF STOUGHTON, MASSACHUSETTS, ASSIGNOR TO THE AERIAL BICYCLE COMPANY, OF MAINE.

AERIAL BICYCLE.

SPECIFICATION forming part of Letters Patent No. 563,793, dated July 14, 1896.

Application filed April 21, 1893. Renewed February 19, 1894. Serial No. 500,749. (No model.)

*To all whom it may concern:*

Be it known that I, HIRAM B. NICKERSON, a citizen of the United States, residing at Stoughton, in the county of Norfolk and State of Massachusetts, have invented certain new and useful Improvements in Aerial Bicycles, of which the following is a specification, reference being had to the drawings hereunto annexed, in which—

Figure 1:
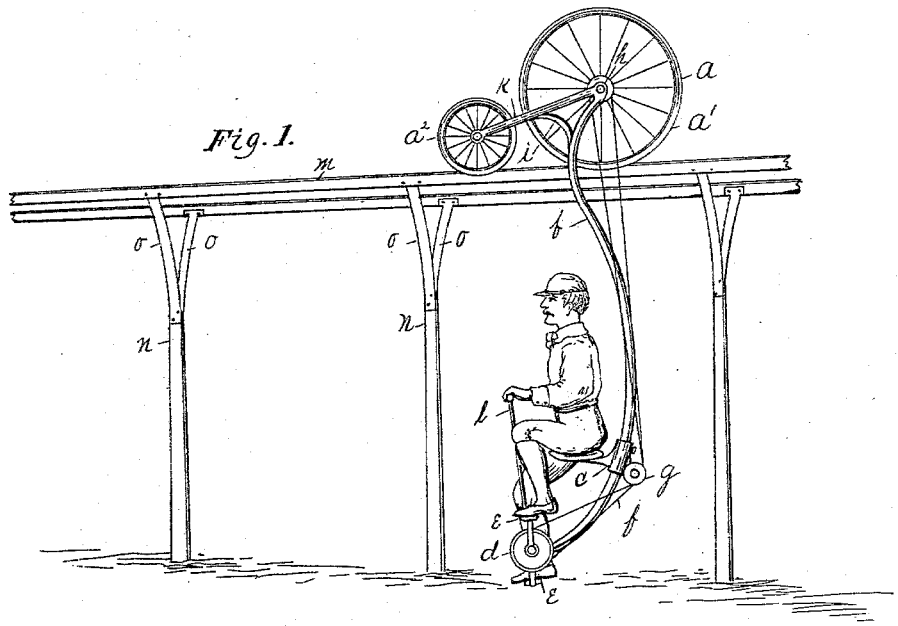
Figure 2:
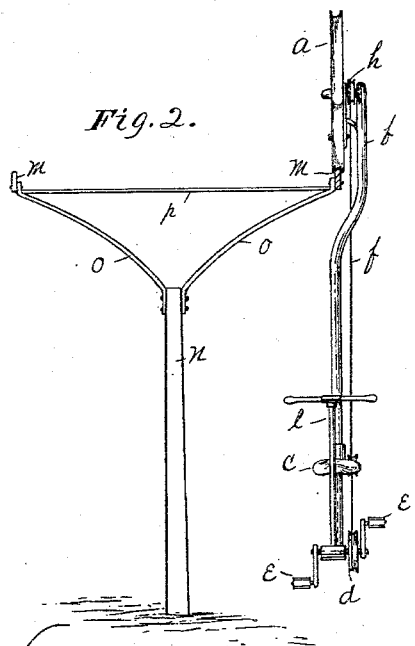

Figure 1 is a view in perspective of my improved aerial bicycle as it appears when being propelled on an elevated track. Fig. 2 is an end view of the same.

Similar letters refer to similar parts in both views.

$a$ represents my aerial bicycle, having wheels $a'$ and $a^2$, with their axles connected together by the rigid tie $k$. Depending from a point between the two wheels $a'$ and $a^2$ and rigidly secured to said tie is a rod $b$, extending downward alongside of and underneath the track on which the bicycle is propelled, and curving to the rear and again to the front in the plane of the track and the wheels to a point under its point of support, where it is provided with a propelling-wheel $d$, mounted in bearings and having its axle provided with the pedals $e$ $e$.

To a collar which is vertically adjustable on the rod $b$ is rigidly secured the seat $c$. The propelling-wheel $d$ is connected with a pulley $h$, rigidly secured to an axle of the bicycle by means of a chain or band $f$, both strands of which pass over a pulley $g$ in rear of and secured to the vertically-adjustable collar on bar $b$ in order that said band may not interfere with the position of the rider on the seat $c$.

From the lower end of the rod $b$ rises a hand-support $l$, whereby the rider on the seat $c$ may steady himself in his position.

The wheels $a'$ and $a^2$ of the bicycle are provided with rims having deep grooves adapted to embrace the top of the track and hold them thereon.

By means of the adjustable seat $c$ the bicycle is made convenient for persons of varying height to ride.

The rod $b$ and the rod or bar $l$, which supports the handle-bars, together constitute an open frame situated below the track, and in the lower open portion of which is mounted the seat for the rider.

I claim—

1. The combination in an aerial bicycle, of the wheels $a'$, and $a^2$, having grooves in their rims, adapted to embrace the top of the track, and having their axles rigidly connected by a tie $k$; a seat-support rigidly connected with said tie, and extending downward alongside of, and underneath the track on which the bicycle is propelled, and curving to the rear, and again to the front in the plane of the track and the wheels, to a point under its point of support where it is provided with a propelling-wheel, mounted in bearings, and having its axle provided with the pedals $e$, $e$; a seat, vertically adjustable on said seat-support; and carrying a pulley in rear thereof; a band passing over said pulley and connecting said propelling-wheel with a pulley rigidly secured to an axle of the bicycle; and a hand-support, rising from the lower end of the seat-support, and in front of the seat thereof; all as shown and described.

2. In an elevated railway wherein the person operating the same is seated beneath the track, the combination with an elevated track, of an open frame lying below the track a plurality of wheels traveling on the track, both of said wheels sustaining the said open frame beneath the track, power-transmitting mechanism connected with at least one of the wheels and having the power-receiving portion thereof located in the lower end of said suspended frame, a seat sustained within the lower open portion of the frame and adjacent to and above the lower portion of the power-transmitting mechanism, and handle-bars connected to said frame at a point where they can be reached from within the frame by a person occupying said seat, the lower end of the power-transmitting mechanism being below both the handle-bars and seat, thus leaving the interior of the open frame adjacent to the seat and handle-bars free from obstruction by the power-transmitting mechanism, substantially as set forth.

3. In an elevated railway, wherein the operator is seated below the track, the combination with an elevated track, of an open frame, a plurality of wheels traveling on the track, the said wheels sustaining the said open frame beneath the track, power-transmitting mechanism connected with at least one of the wheels and having the power-receiving portion thereof located in the lower part of said suspended frame, a seat sustained within the frame and adjacent to the power-receiving portion of the power-transmitting mechanism, and handle-bars connected to said frame and extending to points where they can be reached by a person occupying the seat, said parts being arranged so as to leave the interior of the open frame adjacent to the seat and handle-bars free from obstruction by the power-transmitting mechanism, substantially as set forth.

HIRAM B. NICKERSON.

Witnesses:
JAMES C. HITCH,
HENRY W. MASON.